Oct. 26, 1954
C. G. GERHOLD
2,692,864
DISPERSE PHASE COUNTERCURRENT CONTACTING
OF SUBDIVIDED PARTICLES
Filed Aug. 23, 1950
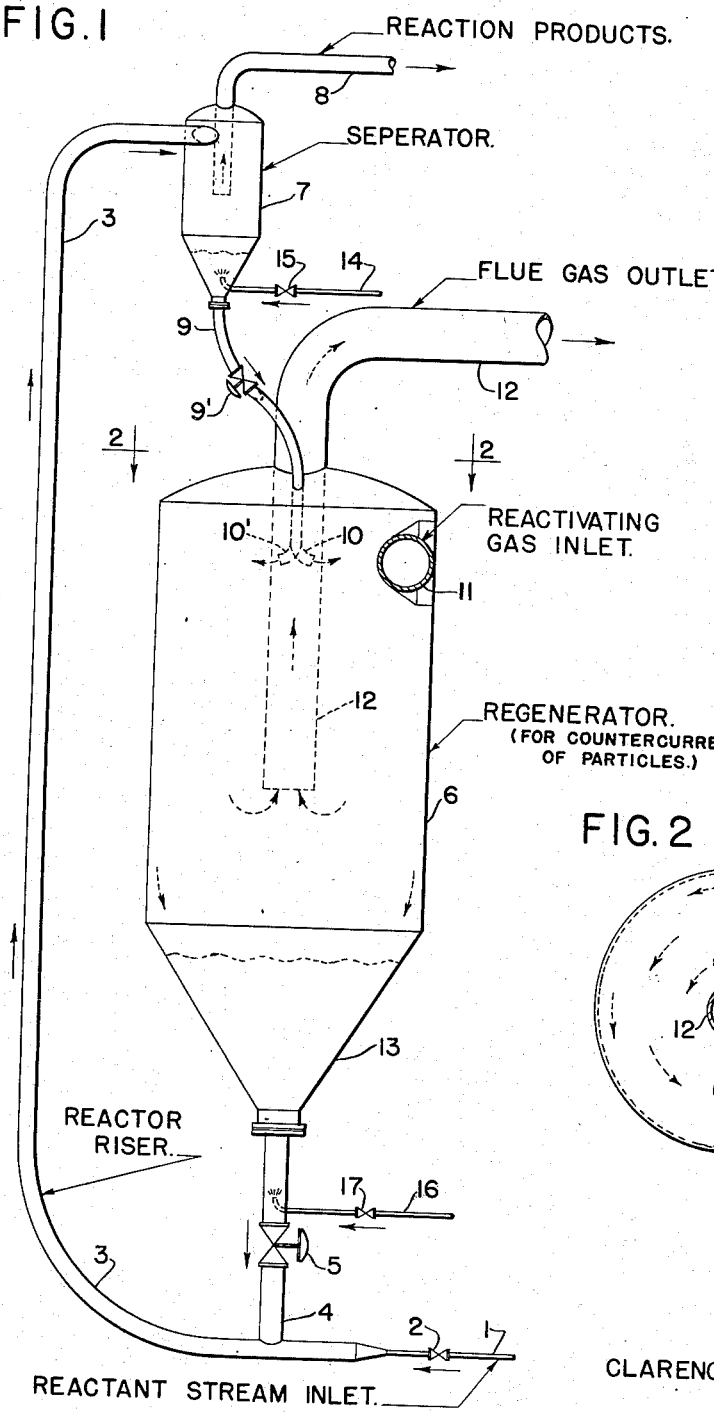
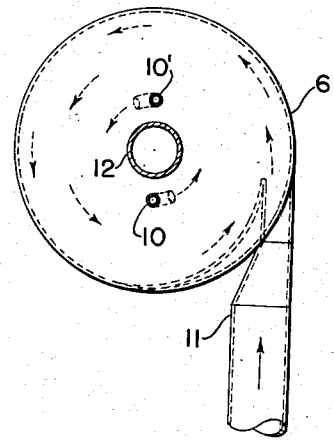
INVENTOR:
CLARENCE G. GERHOLD.
BY: *Chester J. Giuliani*
*Philip G. Liggett*
ATTORNEYS:

Patented Oct. 26, 1954

2,692,864

UNITED STATES PATENT OFFICE 2,692,864

DISPERSE PHASE COUNTERCURRENT CONTACTING OF SUBDIVIDED PARTICLES

Clarence G. Gerhold, Riverside, Ill., assignor to Universal Oil Products Company, Chicago, Ill., a corporation of Delaware Application August 23, 1950, Serial No. 180,983

4 Claims. (Cl. 252—417)

This invention relates to improved means for effecting the disperse phase contacting of catalyst or other subdivided particles with gaseous or vaporous contacting streams, and more specifically to an improved method for effecting a transverse flow of catalyst or other subdivided solid particles with respect to the freshly introduced portion of a gaseous or vaporous contacting stream, while the particles are in a dilute or disperse phase fluidized flow. In general there has been no satisfactory method of effecting a countercurrent contacting operation where the subdivided particles are maintained in a light phase or disperse phase condition.

In most instances, the dilute phase contacting of catalyst or other finely divided solid material has been effected only in a co-current type of flow, with the gaseous or vaporous contacting stream fluidizing and carrying the subdivided particles along therewith in a continuous flow through an elongated contacting zone or tortuous passageway. The various countercurrent contacting operations have been carried out primarily in moving bed or dense phase fluidized bed operations, wherein the particles descend in one type or another of gravity flow countercurrently to a rising contacting stream. The latter may be a reactant material, heating stream, reactivating medium, stripping meduim or the like.

It is a principal object of the present invention to provide a method for effecting a disperse phase fluidized condition and at the same time passing the subdivided particles in a path which is transverse with respect to the zone of introduction of the contacting and fluidizing medium.

Briefly, the present invention provides a method for contacting subdivided solid particles with a gaseous or vaporous stream in a disperse phase condition which comprises, introducing the subdivided particles to the central portion of a cylindrically shaped and confined contacting zone, continuously introducing the gaseous contacting stream tangentially into the cylindrical zone and effecting a contacting of the particles within a centrifugally moving mixed stream, withdrawing a resulting contacted gaseous stream from the central portion of the cylindrical zone, and continuously withdrawing resulting contacted particles from the outer periphery thereof.

The contacting of subdivided particles such as catalysts, in a cylindrical zone maintaining a cyclone or centrifugal type of flow, may be used to advantage in connection with many types of processing or contacting operations. For example, it is frequently desirable to contact heat carrying particles or catalytic material, with an oxygen-containing stream to effect the burning of a deleterious deposit on the particles, such as carbon or coke on catalyst particles in a hydrocarbon conversion process, so that the material may be reactivated and reused in the operation. The method of this invention passes the particles with a maximum amount of the carbonaceous deposit into a zone of low oxygen concentration, while the particles with at least a portion of the carbon deposit removed pass into the zone of high oxygen concentration. This flow provides a more efficient removal operation and more uniform temperatures throughout the entire reactivating zone, as well as insuring the substantially complete use of the oxygen within the reactivating stream, so that unused oxygen is not passed outwardly from the regenerating zone with the resulting combustion of flue gases.

The above-described flow is also of advantage in various types of stripping operations, so that adsorbed or occluded gases or vapors passing with a contacting material are more completely removed by the stripping medium which is introduced into contact with the solid particles. In other words, the solid particles with at least a portion of the adsorbed or occluded material is removed prior to the particles coming into contact with the fresh stripping medium and the result is a particle stream being discharged which is substantially free of all material which can be removed by the stripping medium. For example, in hydrocarbon conversion processes, it is customary to strip contacted catalyst particles passing from the reaction zone, with steam, nitrogen, flue gas, or other inert medium, so that a substantial portion of occluded or adsorbed hydrocarbon vaporous material may be stripped from the catalyst particles prior to their introduction to a regeneration or reactivation zone. Stripping in this instance effects the recovery of valuable hydrocarbon products and at the same time prevents hydrocarbon products from being burned within the reactivation zone causing excess temperature therein or excess oxygen requirements.

In still another instance, the centrifugal and transverse flow may be used effectively in contacting subdivided shale or coal particles with hot gaseous streams to effect distillation or carbonization, and the like.

Effecting the contacting of catalyst particles in a disperse phase regeneration operation, in accordance with the present invention, comprises, introducing the contaminated catalyst particles to the central portion of a substantially cylindrical and confined regeneration zone, introducing the oxygen-containing regenerating stream tangentially into and along the periphery of the cylindrical regenerating zone, and effecting thereby a continuous centrifugal flow contacting of the catalyst particles with the regenerating gaseous stream, with the catalyst particles moving spirally outwardly within the confined regenerating zone transversely with respect to the concentration of unused oxygen within the regenerating stream, continuously withdrawing resulting combustion gases from the central portion of the regenerating zone, and continuously withdrawing resulting contacted catalyst particles from the outer periphery thereof.

Similarly, stripping of subdivided solid particles with a gaseous contacting stream, while the particles are maintained in a dilute disperse phase condition, comprises, introducing the particles continuously into the central portion of a substantially cylindrical and confined stripping zone, continuously introducing a suitable stripping medium into the cylindrical zone tangentially along the periphery thereof and effecting the contacting of the particles within a centrifugally moving stream, whereby the particles move spirally outwardly within the stripping zone transversely with respect to the concentration of fresh or unused stripping medium entering the stripping zone, continuously withdrawing the resulting used stripping medium from the central portion of the stripping zone, and continuously withdrawing stripped or contacted particles from the outer periphery of the zone.

The present improved method of effecting the centrifugal and transverse contacting of subdivided particles while they are maintained in a dilute or disperse phase condition, is of course not to be limited to regenerating or stripping operations only, for this type of contacting subdivided particles may well be used to advantage in other related processes or particle contacting units. The contacting method of this invention may better be understood by reference to the accompanying drawing and the following description thereof, which illustrates one embodiment, while additional advantages and features will be noted in connection therewith.

Figure 1 of the drawing indicates diagrammatically an elevational view of a particle contacting unit, such as for example where catalyst particles are used continuously within a reaction zone and a regeneration zone.

Figure 2 of the drawing is a sectional plan view of the contacting chamber having particles contacted in a dilute phase centrifugally moving stream, with the plan view as indicated by the line 2—2 of Figure 1.

For the purpose of simplifying the description, there is shown but one embodiment of a typical processing operation, and in this instance, the improved method of contact is used in the reactivation of subdivided solid particles, as for example catalyst particles utilized in a hydrocarbon conversion process. However, as hereinbefore noted, the present method of contacting particles is not limited to regeneration or reactivation of circulated catalyst particles, but well may be used with many reaction, conversion, or stripping operations.

Referring now to both Figures 1 and 2 of the drawing, in a catalytic hydrocarbon conversion process, such as the cracking of a gas-oil stream, the latter is charged by way of line 1 and valve 2 into the lower end of the reactor-riser 3, with the reactant stream contacting hot regenerated catalyst particles descending by way of standpipe 4 and control valve 5 from a suitable reactivator or regenerating chamber 6. The hot regenerated catalyst particles, in a dilute or disperse phase fluidized condition, pass with the resulting heated and vaporized hydrocarbon stream upwardly through the elongated reactor-riser line 3, wherein, under suitable catalyst to oil ratios and contacting time the vapors are converted to desired products. Resulting hydrocarbon conversion products, together with contaminated and contacted catalyst particles, are discharged from the upper end of the elongated reaction zone 3 into a suitable separator 7. Substantially catalyst free reaction products may be discharged by way of line 8, while catalyst particles are collected within the lower portion of the separator 7 for reuse in the continuous conversion process. In the present embodiment, the recovered catalyst particles pass from separators 7 by way of line 9 and control valve 9' to inlet lines 10 and 10'. Two particle inlet lines communicating with the interior of regenerating chamber 6 are utilized to more evenly distribute contacted catalyst particles into the regenerating zone. The lower ends of the inlet lines 10 and 10' are also turned or curved slightly, in order to discharge the particles more directly into and along with the centrifugally moving gaseous flow maintained within the regenerating chamber 6.

Dilute or disperse phase catalytic contact of reactant streams has several advantages over the dense phase bed contacting, in that large contacting or reaction chambers utilized in the dense phase operation are expensive to build and to support. Also, by effecting a dilute or disperse phase type of contacting a considerably smaller catalyst inventory may be maintained within the entire conversion unit, and there is a resulting lower initial cost in starting up the unit.

While cocurrent flow through tubular reaction zones has been found to provide efficient and adequate conversion of the hydrocarbon reactant stream in a catalytic cracking process, it has been found that, in general, cocurrent disperse phase contacting to effect the regeneration or reactivation of catalyst particles is not satisfactory to remove an optimum amount of the carbon or coke deposit from catalyst, without the use of excessively long contacting times within an elongated regeneration zone. Thus, in accordance with the present invention a novel disperse phase centrifugal flow is provided wherein the catalyst particles pass in a direction which is transverse to the high oxygen gradient maintained within the regenerating zone. An air or oxygen-containing reactivating gas stream is introduced to the cylindrically shaped chamber 6 by way of tangential inlet 11 so that the resulting incoming stream passes along the inside wall of the chamber and provides a continuously moving centrifugal gaseous stream within the regenerator 6, somewhat in the manner of a cyclone or centrifugal type particle separating apparatus. The present contacting chamber differs, however, from a separating apparatus in that the particles to be contacted are introduced into the central portion of the contacting chamber, and in this case by way of inlet lines 10 and 10' which straddle the gas outlet line 12, instead of along with the gaseous stream. The outlet conduit 12 has an open lower end extending, from a lower or intermediate portion of chamber 6, vertically upward and outwardly from the top of the chamber.

In this regenerating operation, the oxidizing gas stream entering by way of inlet 11 sets up a centrifugally moving flow within the interior of the regenerator 6 and entrains the catalyst particles in a dilute or disperse phase fluidized flow. The particles pass from the respective inlet lines 10 and 10' downwardly and outwardly in a spiral-like motion until they ultimately reach the wall of the chamber 6 and fall to the collecting hopper 13 for subsequent passage to the standpipe or outlet line 4. The reactivating gas stream entering the tangential inlet 11 moves centrifugally and spirally inwardly and is eventually withdrawn through the center outlet line 12 as resulting combustion or flue gas, thus, the reactivating and fluidizing gas has its greatest oxygen content along the outer periphery of the regenerating chamber and a gradient of decreasing oxygen content as it passes to the central portion of the chamber, where the coked particles are introduced. As the regenerating stream contacts and carries the coked particles, the oxygen content is utilized in burning and removing the carbonaceous deposit from the particles, first contacting those particles which have been centrifuged from the center portion of the chamber outwardly across the vertical laminar layers of the centrifugally moving stream to the outer portion of the zone near the outer periphery and wall of the chamber. Thus, these particles normally have at least a portion of the carbonaceous deposit oxidized and removed by the time they reach the outer portion of the chamber and come in contact with the freshly introduced reactivating stream. Further, the gaseous stream which moves centrifugally through the entire regenerating zone has in effect vertical laminar layers which have a lower oxygen content, as they approach the inner portion of the zone, as a result of effecting oxidation of coke on particles in the outer portion of the zone, and a gaseous stream having a relatively low oxygen content contacts those particles which are introduced into the central portion of the zone with a large amount of carbonaceous or coke deposit. This centrifugal flow and fluidized contacting is maintained in a continuous operation, so that freshly contaminated catalyst particles introduced to the regenerating zone continuously flow from the central portion thereof outwardly across the laminar layers of the centrifugally moving stream and transversely to the oxygen gradient of the reactivating stream, which is continuously introduced tangentially into and along the outer periphery of the reactivating zone.

One or more particle inlets may be utilized to pass the coked particles into the central portion of the contacting chamber, the use of two inlets, such as 10 and 10', is not in any way limiting. It is, however, advantageous to provide some means for properly directing the particle flow into the centrifugally whirling gaseous stream maintained in the contacting zone, in order to gain advantage of the inertia of the gravity flow of the particles downwardly through line 9 and lines 10 and 10', while in addition it is desirable to prevent the "back flow" of particles, with a gaseous stream passing upwardly through the particle inlet lines. The present embodiment, as previously noted, has the lower ends of the inlets 10 and 10' curved in the direction of the centrifugal flow.

The size of the centrifugal flow contacting chamber may of course vary with the quantity of solid particles or catalysts to be contacted, the quantity or mass flow of the reactivating stream necessary to effect the desired degree of regeneration, as well as optimum contacting time. The diameter of the contacting chamber may however be limited to that which readily maintains a centrifugally moving stream within the interior thereof. Also there may be optimum radial distances to accommodate given size particles entering the central portion of the unit so that they may be centrifuged in a gradual spiral flow to reach the wall of the chamber and fall to the collecting hopper. The length of the cylindrical portion of the contacting chamber and the vertical positioning of the open inlet end of the gas outlet conduit 12 may be varied to effect efficient and optimum contacting for a particular conversion, regenerating, or stripping process. In a variation of the construction and arrangement of the regenerating chamber, streams may be provided to skim off contacted particles from the periphery of the chamber. In other words, the contacted particles need not all fall into a collecting hopper as shown in the present drawing.

In the present diagrammatic embodiment, a stripping medium is introduced to the lower portion of separator 7, by way of line 14 and control valve 15, so that occluded or adsorbed vaporous products from the reaction zone may be removed prior to the particles passing into the regenerating zone. Steam or other substantially inert gaseous medium may be utilized advantageously as a stripping medium. In a similar manner, a stripping medium may be passed into the outlet conduit 4, or lower end of the particle collecting hopper 13 at the lower end of the regeneration zone, so that flue gas or other deleterious gases may not pass with the catalyst particles to the reaction zone. Steam or other stripping medium may thus be passed by way of line 16 and control valve 17 into line 4 and countercurrently upwardly through the particle bed to effect the stripping of the particles.

Where desired, separate stripping chambers may be utilized to more efficiently and thoroughly contact the catalyst particles prior to their introduction into a succeeding processing zone, as are now commonly used in conventional commercial processing plants of a fluidized catalyst nature. Also, in accordance with the operation of the present invention, a stripping chamber operating in the same manner as the aforedescribed regenerating or reactivating chamber 6 may be utilized in connection with a catalyst contacting unit. In a stripping operation, the particles to be contacted are introduced into the central portion of the cylindrical contacting zone and the stripping medium is introduced tangentially into and along the wall or periphery of the zone. Thus, during the continuous operation a centrifugally moving dilute phase flow is maintained within the zone and the particles are gradually centrifuged from the central portion across the laminar layers of the fluidized flow to the wall of the chamber, where they lose their velocity and fall to the lower collecting zone. At the same time, the stripping medium gradually flows in a continuous spiralling flow from the outer periphery of the zone into the central portion thereof to be discharged through a central outlet conduit, so that the particles being stripped are moving transversely with respect to the flow of the fresh stripping medium, with all the advantages of this particular flow in a processing operation. This stripping flow is not limited to the stripping of catalyst particles in a hydrocarbon cracking operation, but in a broad aspect relates to all types of stripping, and contacting operations wherein a gaseous or vaporous medium may desirably pass in contact with subdivided solid particles, including purification, dehydration, adsorption or absorption types of processing.

I claim as my invention:

1. A method for regenerating subdivided solid catalyst particles with a gaseous oxygen-containing stream within a confined and cylindrically shaped regeneration zone and maintaining a relatively low concentration of catalyst particles within the regenerating gaseous stream, which comprises, introducing said catalyst particles to the central portion of said cylindrical regenerating zone, introducing said oxygen-containing regenerating stream tangentially into and along the periphery of said cylindrical regenerating zone and passing the same inwardly toward the central portion of said zone, effecting the continuous centrifugal contacting of said catalyst particles with said regenerating gaseous stream while discharging said catalyst particles outwardly toward the periphery of said regenerating zone, continuously withdrawing resulting combustion gases from the central portion of said regenerating zone, and continuously withdrawing the resulting contacted catalyst particles from the outer periphery thereof.

2. A method for effecting the stripping of subdivided solid particles with a substantially inert gaseous stream, which comprises, passing said particles into the central portion of a confined and cylindrically shaped contacting zone, introducing said stripping medium tangentially into and along the periphery of the stripping zone and effecting the continuous centrifugal contacting and entrainment of said particles therewith, centrifuging the subdivided particles outwardly within said contacting zone across the vertical laminar layers of the gaseous medium, continuously withdrawing a spent stripping medium from the central portion of the contacting zone, and continuously withdrawing stripped contacted particles from the outer periphery thereof.

3. A method for contacting subdivided solid particles with a gaseous stream in a confined contacting zone, maintaining a relatively low concentration of particles within the contacting gaseous stream, which comprises, introducing said particles to the upper central portion of a vertical and substantially cylindrical contacting zone and discharging the same spirally downwardly and outwardly across said zone toward the periphery thereof, continuously introducing said gaseous stream tangentially to the upper peripheral portion of said zone and passing the same spirally inwardly and downwardly toward the central portion of said zone, thereby effecting a centrifugal contacting of said particles and gaseous stream, withdrawing the resultant contacted gaseous stream upwardly through the central portion of said zone from an intermediate point in the height thereof below the point of introduction of said particles, and withdrawing the contacted particles downwardly from the outer periphery of said zone.

4. The method of claim 3 further characterized in that said gaseous stream is an oxygen-containing gas.

References Cited in the file of this patent

UNITED STATES PATENTS

| Number | Name | Date |
|---|---|---|
| 2,306,462 | Moorman | Dec. 29, 1942 |
| 2,311,140 | Totzek et al. | Feb. 16, 1943 |
| 2,388,348 | Stimson | Nov. 6, 1945 |
| 2,396,109 | Martin | Mar. 5, 1946 |
| 2,431,884 | Neuschotz | Dec. 2, 1947 |
| 2,444,990 | Hemminger | July 13, 1948 |
| 2,546,042 | Oberfell et al. | Mar. 20, 1951 |